(12) United States Patent
Yamaguchi et al.

(10) Patent No.: US 9,721,170 B2
(45) Date of Patent: Aug. 1, 2017

(54) SELF-LOCATION CALCULATING DEVICE AND SELF-LOCATION CALCULATING METHOD

(71) Applicant: Nissan Motor Co., Ltd., Yokohama-Shi, Kanagawa (JP)

(72) Inventors: Ichiro Yamaguchi, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/119,161

(22) PCT Filed: Feb. 24, 2014

(86) PCT No.: PCT/JP2014/054313
§ 371 (c)(1),
(2) Date: Aug. 16, 2016

(87) PCT Pub. No.: WO2015/125298
PCT Pub. Date: Aug. 27, 2015

(65) Prior Publication Data
US 2017/0024617 A1     Jan. 26, 2017

(51) Int. Cl.
*G06K 9/00* (2006.01)
*G01C 21/28* (2006.01)
*G06T 7/73* (2017.01)

(52) U.S. Cl.
CPC ......... *G06K 9/00798* (2013.01); *G01C 21/28* (2013.01); *G06K 9/00771* (2013.01); *G06T 7/73* (2017.01); *G06T 2207/30244* (2013.01)

(58) Field of Classification Search
CPC .............. G01C 21/28; G06K 9/00771; G06K 9/00798; G06T 7/73; G06T 2207/30244
(Continued)

(56) References Cited

U.S. PATENT DOCUMENTS 6,285,778 B1   9/2001   Nakajima et al.
9,446,652 B2   9/2016   Buma
(Continued)

FOREIGN PATENT DOCUMENTS

JP     H06325298 A    11/1994
JP     2004198211 A    7/2004
(Continued)

OTHER PUBLICATIONS

R. I. Hartley, "A linear method for reconstruction from lines and points," Proc. 5th International Conference on Cmputer Vision, Cambridge, Massachusetts, pp. 882-887 (1995).
(Continued)

*Primary Examiner* — Nguyen Truong
(74) *Attorney, Agent, or Firm* — Young Basile Hanlon & MacFarlane, P.C.

(57) ABSTRACT

A self-location calculating device projects a patterned light onto a road surface around a vehicle, captures and obtains an image of the road surface around the vehicle. When determining that a condition of the road surface around the vehicle changes as much as or more than a threshold value, the self-location calculating device calculates a current position and a current attitude angle of the vehicle in present by adding an amount of change in the attitude to a current position and a current attitude angle of the vehicle which are calculated in a previous information process cycle.

4 Claims, 13 Drawing Sheets

(58) Field of Classification Search
USPC .......................................................... 348/148
See application file for complete search history.

(56) References Cited

U.S. PATENT DOCUMENTS

| | | |
|---|---|---|
| 2005/0163343 A1 | 7/2005 | Kakinami et al. |
| 2013/0182906 A1 | 7/2013 | Kojo et al. |
| 2015/0174981 A1 | 6/2015 | Buma |

FOREIGN PATENT DOCUMENTS

| | | |
|---|---|---|
| JP | 2004198212 A | 7/2004 |
| JP | 2007256090 A | 7/2005 |
| JP | 2008175717 A | 7/2008 |
| JP | 2010101683 A | 5/2010 |
| JP | 2013147114 A | 8/2013 |
| JP | 2013187862 A | 9/2013 |
| WO | 2012172870 A1 | 12/2012 |
| WO | 2014020744 A1 | 2/2014 |

OTHER PUBLICATIONS

D. G. Lowe, "Distinctive Image Features from Scale-Invariant Keypoints," Int. J. Comput. Vis., vol. 60, No. 2, pp. 91-110, Nov. 2004.
Yasushi Kanazawa, et al., "Detection of Feature Points for Computer Vision", IEICE Journal, Dec. 2004, pp. 1043-1048, vol. 87, No. 12.

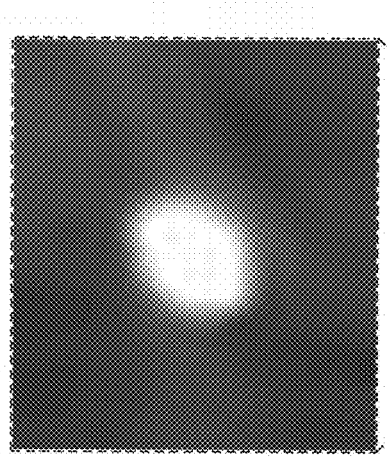
FIG. 4B
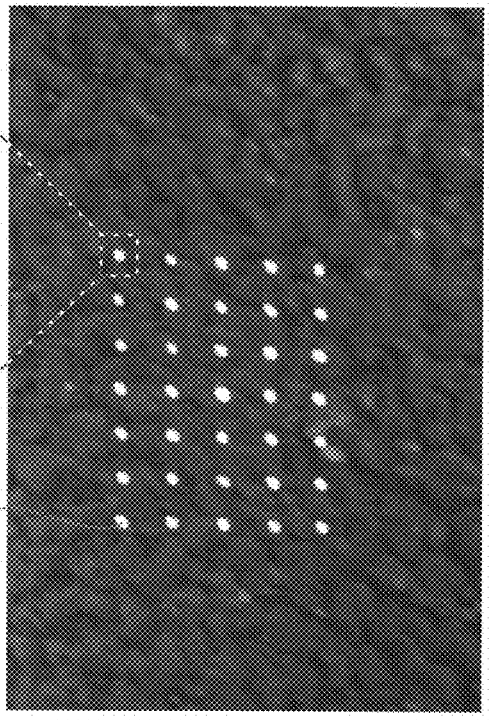
FIG. 4C
FIG. 4A

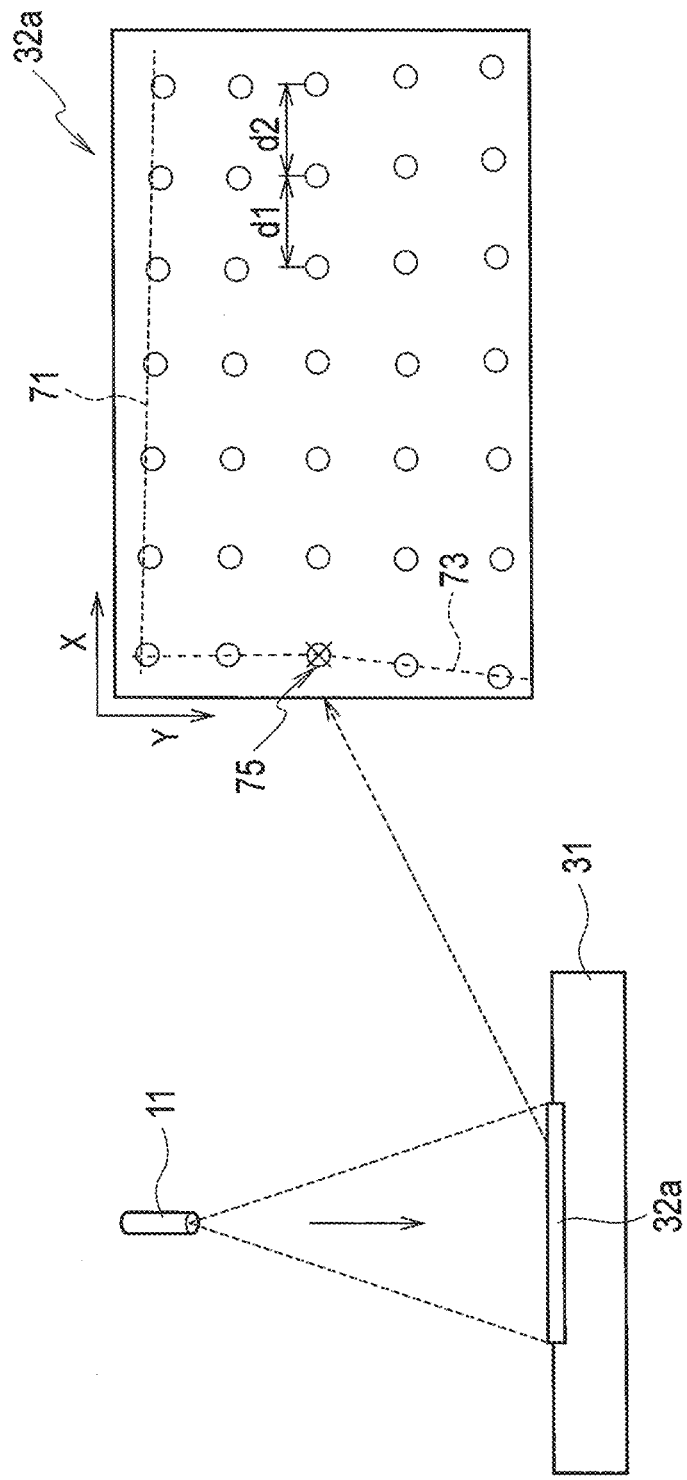

SELF-LOCATION CALCULATING DEVICE AND SELF-LOCATION CALCULATING METHOD

TECHNICAL FIELD

The present invention relates to a self-location calculating device and a self-location calculating method.

BACKGROUND

A technology has been known in which: cameras installed in a vehicle capture and obtain images of surroundings of the vehicle; and an amount of movement of the vehicle is obtained based on changes in the images (see Japanese Patent Application Publication No. 2008-175717). Japanese Patent Application Publication No. 2008-175717 aims at obtaining the amount of movement of the vehicle accurately even if the vehicle moves slightly at slow-speed. To this end, a feature point is detected from each image; the position of the feature point is obtained; and thereby, the amount of movement of the vehicle is obtained from the direction and distance of movement (amount of movement) of the feature point.

The foregoing conventional technology, however, has a problem that when the road surface around the vehicle is uneven or bumpy, the technology cannot calculate the position of the vehicle accurately.

SUMMARY

The present invention has been proposed with the foregoing situation taken into consideration. An object of the present invention is to provide a self-location calculating device and a self-location calculating method which are capable of accurately calculating the self-location of the vehicle even in a case where the road surface around the vehicle is uneven or bumpy.

For the purpose of solving the foregoing problem, the self-location calculating device of one aspect of the present invention captures and thus obtains an image of the road surface around the vehicle onto which a patterned light is projected, and calculates an attitude angle of the vehicle relative to the road surface from a position of the patterned light on the image. Furthermore, the self-location calculating device calculates an amount of change in the attitude of the vehicle based on temporal changes in multiple feature points on the road surface in the obtained image, and calculates a current position and a current attitude angle of the vehicle by adding the amount of change in the attitude to an initial position and the attitude angle of the vehicle. Thereafter, when determining that conditions of the road surface around the vehicle change as much as or more than a threshold value, the self-location calculating device calculates the current position and the current attitude angle of the vehicle by adding the amount of change in the attitude to the current position and the current attitude angle of the vehicle which are calculated in the previous information process cycle.

BRIEF DESCRIPTION OF THE DRAWINGS

FIG. 4 is a diagram showing an image of a patterned light which is obtained by applying a binarization process to an image obtained with the camera;

FIG. 4(a) is a diagram showing the entirety of the patterned light;

FIG. 4(b) is a magnified diagram showing one spotlight;

FIG. 4(c) is a diagram showing a position of the center of gravity of spotlights;

FIG. 7 is a diagram for describing how to estimate an amount of change in a height of the road surface from a position of the patterned light;

DETAILED DESCRIPTION OF THE EMBODIMENTS

Figure 1:
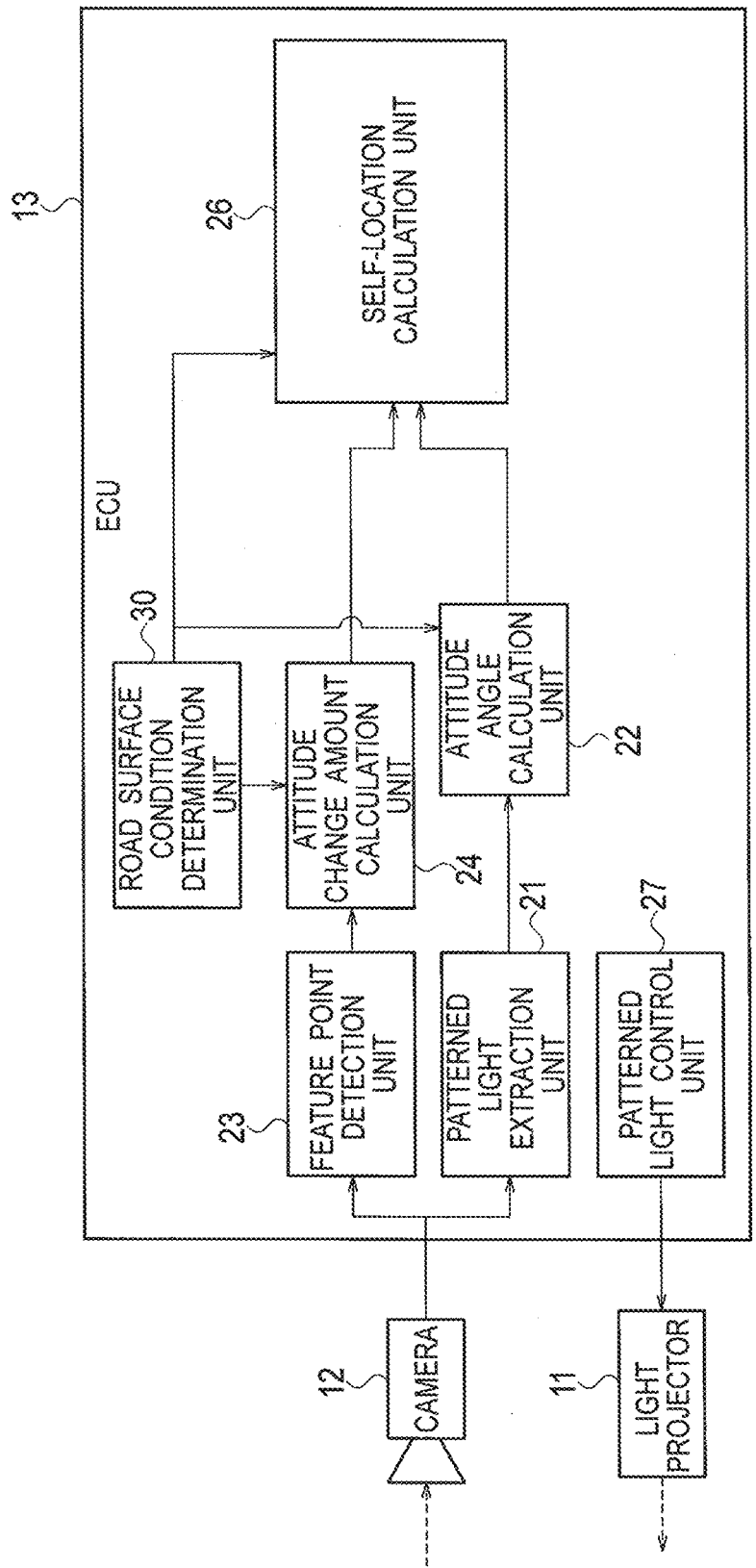
FIG. 1 is a block diagram showing an overall configuration of a self-location calculating device of a first embodiment.

Referring to the drawings, descriptions will be hereinbelow provided for first and second embodiments to which the present invention is applied.

[First Embodiment]

[Hardware Configuration] To begin with, referring to FIG. 1, descriptions will be provided for a hardware configuration of a self-location calculating device of a first embodiment. The self-location calculating device includes a light projector 11, a camera 12 and an engine control unit (ECU) 13. The light projector 11 is installed in a vehicle, and projects a patterned light onto a road surface around the vehicle. The camera 12 is installed in the vehicle, and is an example of an image capturing unit configured to capture and thus obtain images of the road surface around the vehicle, inclusive of an area onto which the patterned light is projected. The ECU 13 is an example of a control unit configured to control the light projector 11, and to perform a series of information process cycles for calculating the self-location of the vehicle from images obtained by the camera 12.

Figure 2:
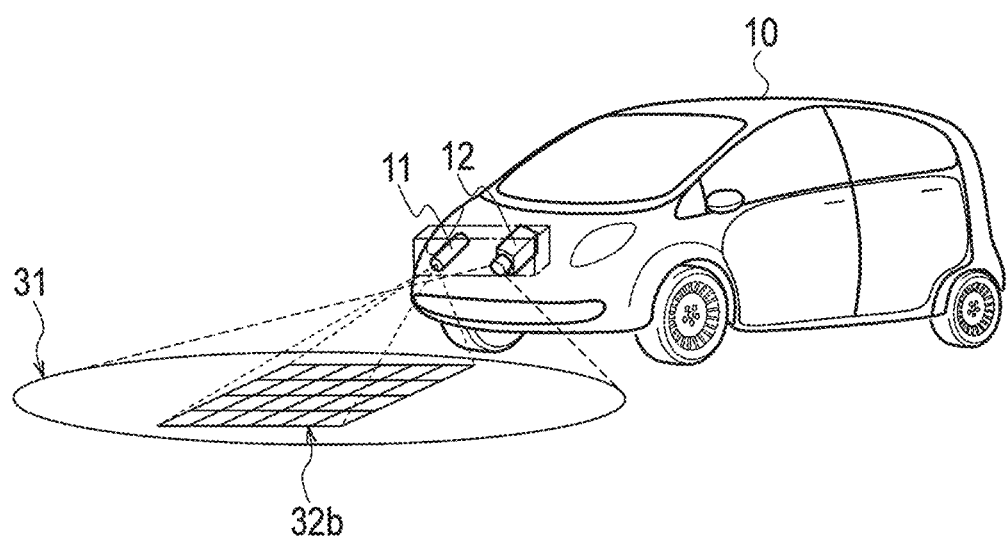
FIG. 2 is an external view showing an example of how a light projector and a camera are installed in a vehicle.

The camera 12 is a digital camera using a solid-state image sensor such as a CCD and a CMOS, and obtains digital images which are capable of image processing. What the camera 12 captures is the road surface around the vehicle. The road surface around the vehicle includes road surfaces in front of, in the back of, at sides of, and beneath the vehicle. As shown in FIG. 2, the camera 12 may be installed in a front section of the vehicle 10, more specifically above a front bumper, for example. The height at and direction in which the camera 12 is set are adjusted in a way that enables the camera 12 to capture images of feature points (textures) on the road surface 31 in front of the vehicle 10 and the patterned light 32b projected from the light projector 11. The focus and diaphragm of the lens of the camera 12 are automatically adjusted as well. The camera 12 repeatedly captures images at predetermined time intervals, and thereby obtains a series of image (frame) groups. Each time the camera 12 captures an image, image data obtained with the camera 12 is transferred to the ECU 13, and is stored in a memory included in the ECU 13.

Figure 3B:
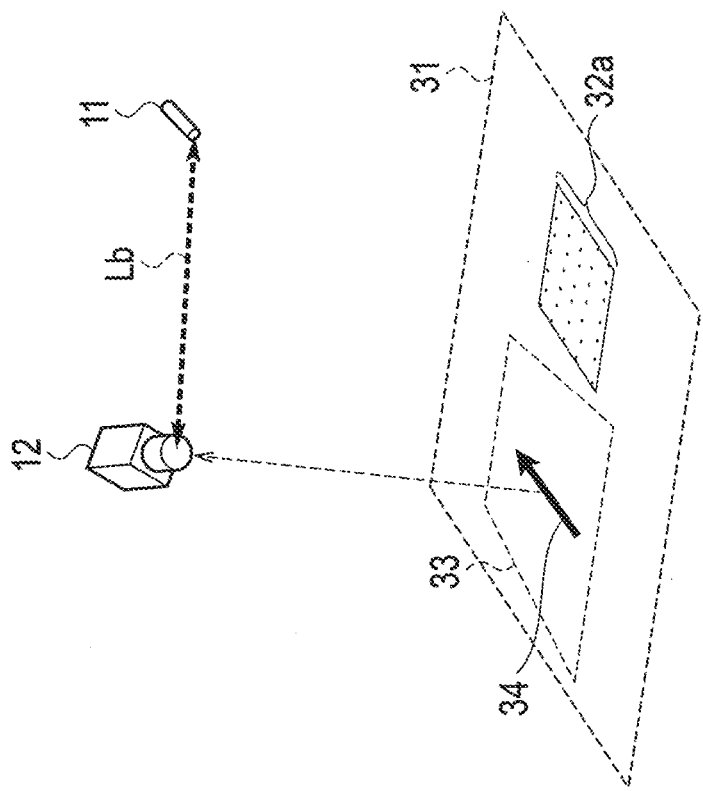
FIG. 3(b) is a diagram showing how a direction of movement of the camera is obtained from temporal changes in a feature point which is detected outside an area onto which a patterned light is projected.

As shown in FIG. 2, the light projector 11 projects the patterned light 32b having a predetermined shape, inclusive of a square or rectangular lattice image, onto the road surface 31 within an image capturing range of the camera 12. The camera 12 captures images of the patterned light projected onto the road surface 31. The light projector 11 includes a laser pointer and a diffraction grating, for example. The diffraction grating diffracts the laser beam projected from the laser pointer. Thereby, as shown in FIGS. 2 to 4, the light projector 11 generates the patterned light (32b, 32a) which includes multiple spotlights arranged in a lattice image or matrix pattern. In examples shown in FIGS. 3 and 4, the light projector 11 generates the patterned light 32a including 5×7 spotlights.

Returning to FIG. 1, the ECU 13 includes a CPU, a memory, and a microcontroller including an input-output section. By executing pre-installed computer programs, the ECU 13 forms multiple information processors which function as the self-location calculating device. For each image (frame), the ECU 13 repeatedly performs the series of information process cycles for calculating the self-location of the vehicle from images obtained with the camera 12. Incidentally, the ECU 13 may be also used as an ECU for controlling other systems of the vehicle 10.

In this respect, the multiple information processors include a patterned light extraction unit 21, an attitude angle calculation unit 22, a feature point detection unit 23, an attitude change amount calculation unit 24, a self-location calculation unit 26, a patterned light control unit 27 and a road surface condition determination unit 30. The attitude change amount calculation unit 24 includes the feature point detection unit 23.

Figure 3A:
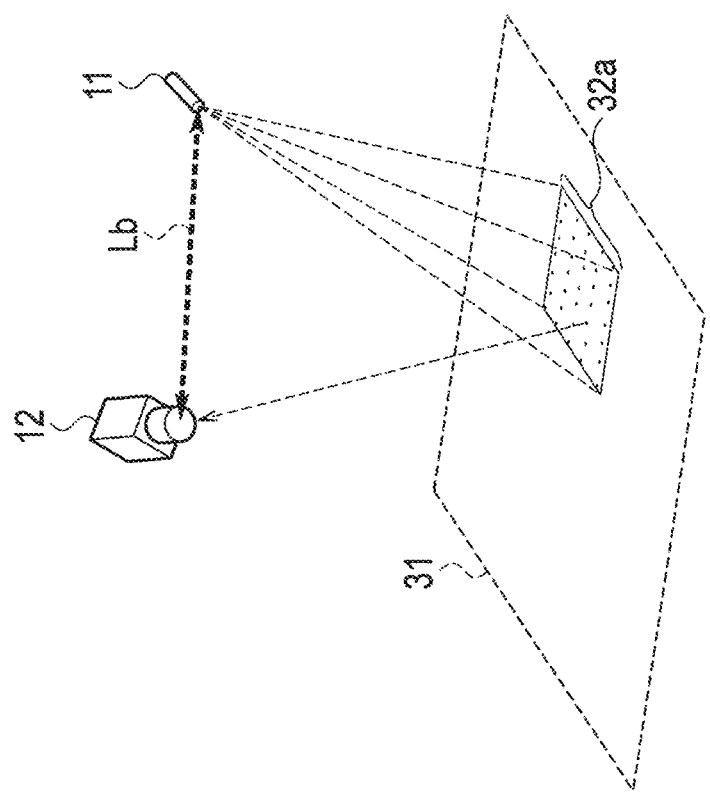
FIG. 3(a) is a diagram showing how a position of spotlighted areas on a road surface by using the light projector and the camera is calculated.

The patterned light extraction unit 21 reads an image obtained by the camera 12 from the memory, and extracts the position of the patterned light from this image. For example, as shown in FIG. 3(a), the light projector 11 projects the patterned light 32a, which includes the multiple spotlights arranged in a matrix pattern, onto the road surface 31, while the camera 12 detects the patterned light 32a reflected off the road surface 31. The patterned light extraction unit 21 applies a binarization process to the image obtained by the camera 12, and thereby extracts only an image of the spotlights Sp, as shown in FIGS. 4(a) and 4(b). Thereafter, as shown in FIG. 4(c), the patterned light extraction unit 21 extracts the position of the patterned light 32a by calculating the center-of-gravity position He of each spotlight Sp, that is to say, the coordinates (Uj, Vj) of each spotlight Sp on the image. The coordinates are expressed using the number assigned to a corresponding pixel in the image sensor of the camera 12. In a case where the patterned light includes 5×7 spotlights Sp, "j" is a natural number not less than 1 but not greater than 35. The memory stores the coordinates (Uj, Vj) of the spotlight Sp on the image as data which indicates the position of the patterned light 32a.

The attitude angle calculation unit 22 reads the data on the position of the patterned light 32a from the memory, and calculates the distance and attitude angle of the vehicle 10 relative to the road surface 31 from the position of the patterned light 32a on the image obtained by the camera 12. For example, as shown in FIG. 3(a), using the trigonometrical measurement principle, the attitude angle calculation unit 22 calculates the position of each spotlighted area on the road surface 31, as the relative position of the spotlighted area relative to the camera 12, from a base length Lb between the light projector 11 and the camera 12, as well as the coordinates (Uj, Vj) of each spotlight on the image. Thereafter, the attitude angle calculation unit 22 calculates a plane equation of the road surface 31 onto which the patterned light 32a is projected, that is to say, the distance and attitude angle (normal vector) of the camera 12 relative to the road surface 31, from the relative position of each spotlight relative to the camera 12.

It should be noted that in the embodiment, the distance and attitude angle of the camera 12 relative to the road surface 31 are calculated as an example of the distance and attitude angle of the vehicle 10 relative to the road surface 31 since the position of installation of the camera 12 in the vehicle 10 and the angle for the camera 12 to capture images are already known. In other words, the distance between the road surface 31 and the vehicle 10, as well as the attitude angle of the vehicle 10 relative to the road surface 31 can be obtained by calculating the distance and attitude angle of the camera 12 relative to the road surface 31.

To put it specifically, since the camera 12 and the light projector 11 are fixed to the vehicle 10, the direction in which the patterned light 32a is projected and the distance (the base length Lb) between the camera 12 and the light projector 11 are already known. For this reason, using the trigonometrical measurement principle, the attitude angle calculation unit 22 is capable of obtaining the position of each spotlighted area on the road surface 31, as the relative position (Xj, Yj, Zj) relative to the camera 12, from the coordinates (Uj, Vj) of each spotlight on the image. Hereinafter, the distance and attitude angle of the camera 12 relative to the road surface 31 will be abbreviated as "distance and attitude angle." The distance and attitude angle calculated by the attitude angle calculation unit 22 are stored into the memory.

It should be noted that the descriptions are provided for the embodiment in which the distance and attitude angle are calculated in each information process cycle. Nevertheless, as mentioned below, when the road surface condition determination unit 30 determines that conditions of the road surface change as much as or more than a threshold value, the attitude angle calculation unit 22 stops calculating the distance and attitude angle of the vehicle 10.

Furthermore, in many cases, the relative position (Xj, Yj, Zj) of each spotlight relative to the camera 12 is not present on the same plane. This is because the relative position of each spotlight changes according to the unevenness of the asphalt of the road surface 31. For this reason, the method of least squares may be used to obtain a plane equation which makes the sum of squares of distance error of each spotlight becomes least. Data on the thus-calculated distance and attitude angle is used by the self-location calculation unit 26 shown in FIG. 1.

The feature point detection unit 23 reads the image obtained by the camera 12 from the memory, and detects feature points on the road surface 31 from the image read from the memory. In order to detect the feature points on the road surface 31, the feature point detection unit 23 may use a method described in "D. G. Lowe, "Distinctive Image Features from Scale-Invariant Keypoints," Int. J. Comput. Vis., vol. 60, no. 2, pp. 91-110, November 200." Otherwise, the feature point detection unit 23 may use a method described in "Kanazawa Yasushi, Kanatani Kenichi, "Detection of Feature Points for Computer Vision," IEICE Journal, vol. 87, no. 12, pp. 1043-1048, December 2004."

Figure 6A:
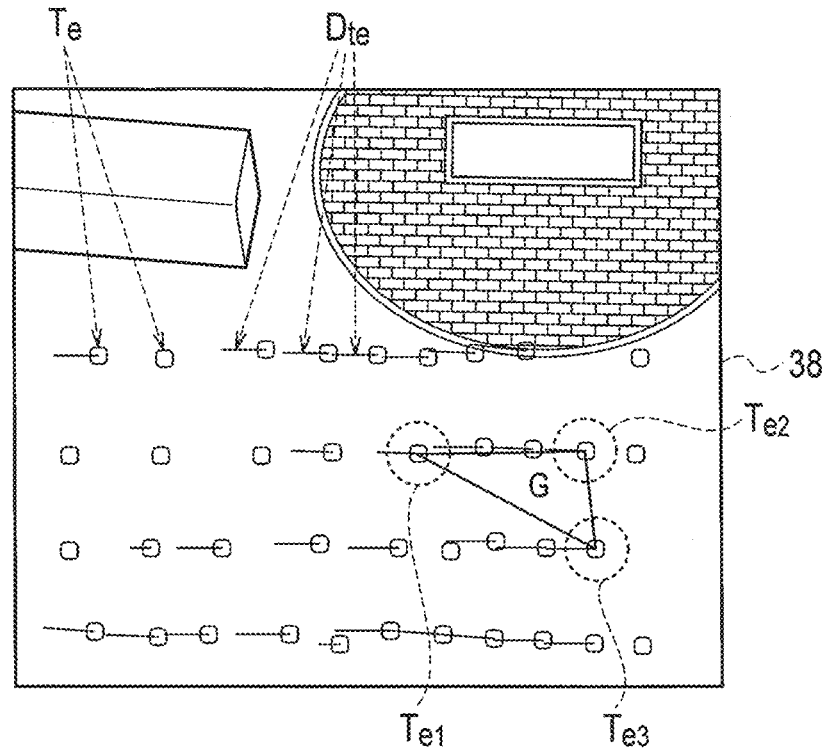
FIG. 6 is a diagram showing feature points detected on the image with FIG. 6(a) being a diagram showing a first frame (image) obtained at time t and FIG. 6(b) being a diagram showing a second frame obtained at time t+Δt.
Figure 6B:
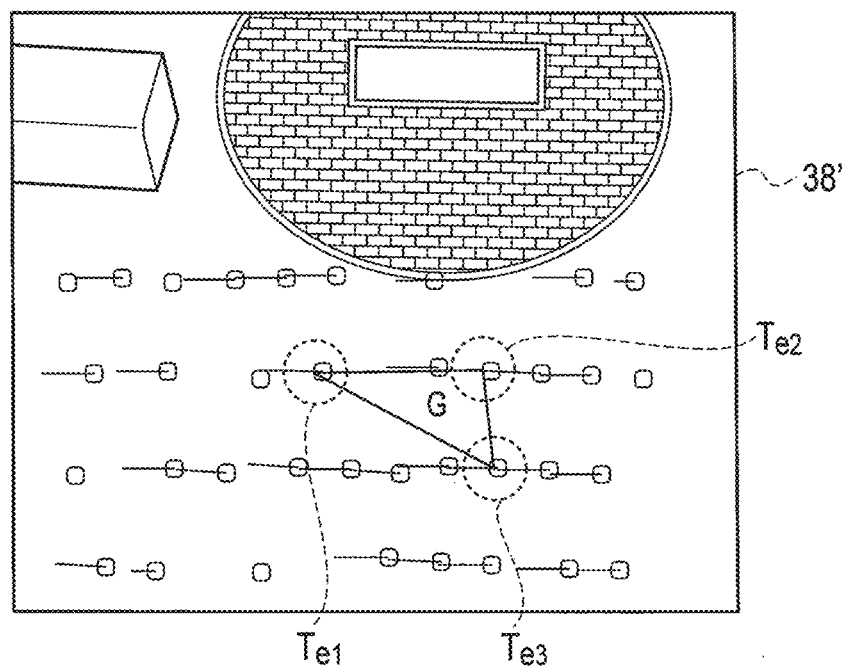

To put it specifically, for example, the feature point detection unit 23 uses the Harris operator or the SUSAN operator, and detects points such as apexes of an object, the luminance values of which are largely different from the vicinities of the points as the feature points. Instead, however, the feature point detection unit 23 may use a SIFT (Scale-Invariant Feature Transform) feature amount so that points around which the luminance values change with certain regularity are detected as the feature points. And the feature point detection unit 23 counts the total number N of feature points detected from one image, and assigns identification numbers (i (1≤i≤N)) to the respective feature points. The position (Ui, Vi) of each feature point on the image are stored in the memory inside the ECU 13. FIGS. 6(a) and 6(b) each shows examples of the feature points Te which are detected from the image captured by the camera 12. Furthermore, directions of changes of each feature point Te and amounts of changes in each feature point Te are expressed with vectors Dte.

It should be noted that in the embodiment, particles of asphalt mixture with a particle size of not less than 1 cm but not greater than 2 cm are assumed as the feature points on the road surface 31. The camera 12 employs the VGA resolution mode (approximate 300 thousand pixels) in order to detect the feature points. In addition, the distance of the camera 12 relative to the road surface 31 is approximately 70 cm. Moreover, the direction in which the camera 12 captures images is tilted at approximately 45 degrees to the road surface 31 from the horizontal plane. What is more, the luminance value of each image captured by the camera 12 and thereafter sent to the ECU 13 is within a range of 0 to 255 (0: darkest, 255: brightest).

The attitude change amount calculation unit 24 reads, from the memory, the positional coordinates (Ui, Vi) of the multiple feature points on an image included in an image of previous frame (at time t) which is among the image of flames captured at each certain information process cycle. Furthermore, the attitude change amount calculation unit 24 reads, from the memory, the positional coordinates (Ui, Vi) of the multiple feature points on the image included in an image of the current frame (at time t+Δt). Thereafter, based on the temporal changes in the positions of the multiple feature points on the image, the attitude change amount calculation unit 24 obtains an amount of change in the attitude of the vehicle. In this respect, the amount of change in the attitude of the vehicle includes both "amounts of changes in the distance and attitude angle" of the vehicle relative to the road surface and an "amount of movement of the vehicle" on the road surface. Descriptions will be hereinbelow provided for how to calculate the "amounts of changes in the distance and attitude angle" and the "amount of movement of the vehicle".

Figure 5:
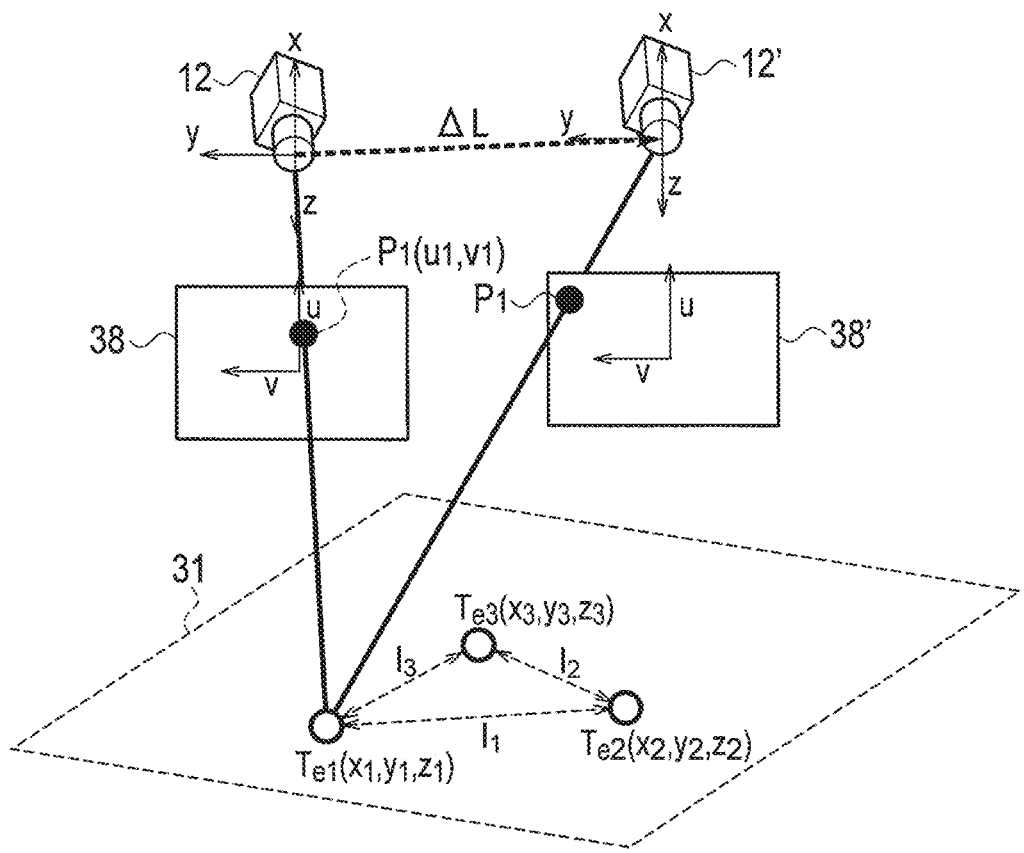
FIG. 5 is a schematic diagram for describing a method of calculating amounts of changes in a distance and attitude angle.

The amounts of changes in the distance and attitude angle can be obtained as follows, for example. FIG. 6(a) shows an example of a first frame (image) 38 (in FIG. 5) captured at time t. Let us assume a case where as shown in FIGS. 5 and 6(a), a relative position (Xi, Yi, Zi) of each of three feature points Te1, Te2, Te3 are calculated on the first frame 38, for example. In this case, a plane G (see FIG. 6(a)) identified by the feature points Te1, Te2, Te3 can be regarded as the road surface. Accordingly, the attitude change amount calculation unit 24 is capable of obtaining the distance and attitude angle (normal vector) of the camera 12 relative to the road surface (the plane G), from the relative position (Xi, Yi, Zi) of each of the feature points. Furthermore, from an already-known camera model, the attitude change amount calculation unit 24 is capable of obtaining a distance l1, l2, l3 between each feature point Te1, Te2, Te3, as well as an angle between straight lines joining each feature points Te1, Te2, Te3. The camera 12 in FIG. 5 shows the position of the camera when the first frame is captured.

It should be noted that in FIG. 5, the three-dimensional coordinates (Xi, Yi, Zi) of the relative position of each feature point relative to the camera 12 are set in a way that: the Z-axis coincides with the direction in which the camera 12 captures the image; and the X and Y axes orthogonal to each other in a plane including the camera 12 are lines normal to the direction in which the camera 12 captures the image. Meanwhile, the coordinates on the image 38 are set such that: the V-axis coincides with the horizontal direction; and the U-axis coincides with the vertical direction.

FIG. 6(b) shows a second frame 38' obtained at time (t+Δt) where the time length Δt passed from time t. A camera 12' in FIG. 5 shows a position of the camera when camera captures the second frame 38'. As shown in FIGS. 5 and 6(b), the camera 12' captures an image including the feature points Te1, Te2, Te3 in the second frame 38', and the feature point detection unit 23 detects the feature points Te1, Te2, Te3 from the image. In this case, the attitude change amount calculation unit 24 is capable of calculating an amount ΔL of movement of the camera 12 in the interval of time Δt from: the relative position (Xi, Yi, Zi) of each of the feature points Te1, Te2, Te3 at time t; a position P1 (Ui, Vi) of each feature point on the second frame 38'; and the camera model of the camera 12. Accordingly, the attitude change amount calculation unit 24 is capable of calculating the amount of movement of the vehicle. Furthermore, the attitude change amount calculation unit 24 is capable of calculating the amounts of changes in the distance and attitude angle as well. For example, the attitude change amount calculation unit 24 is capable of calculating the amount (ΔL) of movement of the camera 12 (the vehicle) and the amounts of changes in the distance and attitude angle of the camera 12 (the vehicle) by solving the following system of simultaneous equations (1) to (4). Incidentally, the equation (1) mentioned below is based on an ideal pinhole camera free from strain and optical axial misalignment which is modeled after the camera 12, where $\lambda i$ and f denote a constant and a focal length. The parameters of the camera model may be calibrated in advance.

[Equation (1)]

$$\lambda_i \begin{bmatrix} u_i \\ v_i \\ 1 \end{bmatrix} = \begin{bmatrix} f & 0 & 0 \\ 0 & f & 0 \\ 0 & 0 & 1 \end{bmatrix} \begin{bmatrix} x_i \\ y_i \\ z_i \end{bmatrix} \quad (1)$$

[Equation (2)]

$$(x_1 - x_2)^2 + (y_1 - y_2)^2 + (z_1 - z_2)^2 = l_1^2 \quad (2)$$

[Equation (3)]

$$(x_3 - x_2)^2 + (y_3 - y_2)^2 + (z_3 - z_2)^2 = l_2^2 \quad (3)$$

[Equation (4)]

$$(x_1 - x_3)^2 + (y_1 - y_3)^2 + (z_1 - z_3)^2 = l_3^2 \quad (4)$$

It should be noted that instead of using all the feature points whose relative positions are calculated in the images detected at time t and time t+Δt, the attitude change amount calculation unit 24 may select optimum feature points based on positional relationships among the feature points. An example of a selection method usable for this purpose is the epipolar geometry (the epipolar line geometry described in R. I. Hartley, "A linear method for reconstruction from lines and points," Proc. 5th International Conference on Computer Vision, Cambridge, Mass., pp. 882-887 (1995)).

If like in this case, the feature points Te1, Te2, Te3, the relative positions of which on the frame image 38 at time t are calculated, are detected by the feature point detection unit 23 from the frame image 38' at time t+Δt as well, the attitude change amount calculation unit 24 is capable of calculating the "amount of change in the attitude angle of the vehicle" from the relative positions (Xi, Yi, Zi) of the multiple feature points on the road surface and the temporal changes of the positions (Ui, Vi) of the feature points on the image. Furthermore, the attitude change amount calculation unit 24 is capable of calculating the amount of movement of the vehicle.

To put it specifically, if three or more feature points having correspondence relation between the previous frame and current frame can be detected continuously, the continuation of the process (integration operation) of adding the amounts of changes in the distance and attitude angle makes it possible to continuously update the distance and attitude angle without using the patterned light 32a. Nevertheless, the distance and attitude angle calculated using the patterned light 32a, or a predetermined initial distance and initial attitude angle, may be used for the first information process cycle. In other words, the distance and attitude angle which are starting points of the integration operation may be calculated using the patterned light 32a, or may use predetermined initial values. It is desirable that the predetermined initial distance and the predetermined initial attitude angle are a distance and an attitude angle determined with at least the occupants and payload of the vehicle 10 taken into consideration. For example, the distance and attitude angle calculated using the patterned light 32a which is projected while the ignition switch of the vehicle 10 is on and when the shift position is moved from the parking position to another position may be used as the predetermined initial distance and the initial attitude angle. Thereby, it is possible to obtain the distance and attitude angle which is not affected by the roll movement or pitch movement due to a turn, acceleration or deceleration of the vehicle 10.

It should be noted that the associating of the feature points in the current frame with the feature points in the previous frame may be achieved, for example, by: storing an image of a small area around each detected feature point into the memory; and for each feature point, making a determination from a similarity in luminance and color information. To put it specifically, the ECU 13 stores a 5(horizontal)×5(vertical)-pixel image around each detected feature point into the memory. If for example, the error in the luminance information having 20 or more pixels is equal to or less than 1%, the attitude change amount calculation unit 24 determines that the feature points in question correspond between the current and previous frames. Thereafter, the amount of change in the attitude obtained through the foregoing process is used by the self-location calculation unit 26 in the next process step to calculate the self-location of the vehicle 10.

The self-location calculation unit 26 calculates the current distance and attitude angle of the vehicle 10 from the "amounts of changes in the distance and attitude angle" calculated by the attitude change amount calculation unit 24. In addition, the self-location calculation unit 26 calculates the self-location of the vehicle 10 from the "amount of movement of the vehicle" calculated by the attitude change amount calculation unit 24.

Descriptions will be provided for how to perform the foregoing calculations in a specific case where the distance and attitude angle calculated by the attitude angle calculation unit 22 (that is to say, the distance and attitude angle calculated using the patterned light) are set as the starting points of the calculations. In this case, the self-location calculation unit 26 updates the distance and attitude angle with the most recent numerical values by sequentially adding (performing an integration operation on) the amounts of changes in the distance and attitude angle calculated for each frame by the attitude change amount calculation unit 24 to the starting points, that is to say, the distance and attitude angle calculated by the attitude angle calculation unit 22. In addition, the self-location calculation unit 26 calculates the self-location of the vehicle by: setting the position of the vehicle, which is obtained when the attitude angle calculation unit 22 calculates the distance and attitude angle, as the starting point (the initial position of the vehicle); and by sequentially adding (performing an integration operation on) the amount of movement of the vehicle from the initial position of the vehicle. For example, by setting the starting point (the initial position of the vehicle) which matches the position on a map, the self-location calculation unit 26 is capable of sequentially calculating the current self-location of the vehicle on the map.

Thereby, the attitude change amount calculation unit 24 is capable of calculating the self-location of the vehicle by obtaining the amount (ΔL) of movement of the camera 12 for the time length Δt. In addition, the attitude change amount calculation unit 24 is capable of calculating the amounts of changes in the distance and attitude angle at the same time. For these reasons, with the amounts of changes in the distance and attitude angle of the vehicle taken into consideration, the attitude change amount calculation unit 24 is capable of accurately calculating the amount (ΔL) of movement in six degrees of freedom (forward/rearward moving, leftward/rightward moving, upward/downward moving, yawing, pitching and rolling). In other words, an error in estimating the amount (ΔL) of movement can be minimized even if the distance and attitude angle are changed by the roll movement or pitch movement due to the turn, acceleration or deceleration of the vehicle 10.

In the embodiment, the amount (ΔL) of movement of the camera 12 is calculated by: calculating the amounts of changes in the distance and attitude angle; and updating the distance and attitude angle. Instead, however, the amount (ΔL) of movement of the camera 12 may be calculated by: calculating the amount of change in only the attitude angle of the camera 12 relative to the road surface 31; and updating only the attitude angle of the camera 12. In this case, it may be supposed that the distance between the road surface 31 and the camera 12 remains constant. This makes it possible to reduce the operation load on the ECU 13 while minimizing the error in estimating the amount (ΔL) of movement with the amount of change in the attitude angle taken into consideration, and to increase the operation speed of the ECU 13.

The patterned light control unit 27 controls the projection of the patterned light 32a by the light projector 11. For example, when the ignition switch of the vehicle 10 is turned on, and the self-location calculating device becomes activated, the patterned light control unit 27 starts to project the patterned light 32a at the same time. Thereafter, until the self-location calculating device stops its operation, the patterned light control unit 27 continues projecting the patterned light 32a. Otherwise, the patterned light control unit 27 may alternately turn on and off the light projection in predetermined intervals.

The road surface condition determination unit 30 detects changes in the conditions of the road surface around the vehicle, and determines whether or not the conditions of the road surface change as much as or more than the threshold value. If the road surface condition determination unit 30 determines that the conditions of the road surface change as much as or more than the threshold value, the self-location calculation unit 26 fixes the starting points at the current position of the vehicle 10, as well as the current distance and attitude angle of the vehicle 10 relative to the road surface, which are calculated in the previous information process cycle. Thereby, the attitude angle calculation unit 22 stops calculating the distance and attitude angle of the vehicle 10 relative to the road surface. Meanwhile, the self-location calculation unit 26 calculates the current position of the vehicle in present, as well as the current distance and attitude angle of the vehicle 10 relative to the road surface, by adding the amount of change in the attitude to the current position of the vehicle 10, as well as the current distance and attitude angle of the vehicle 10 relative to the road surface, which are calculated in the previous information process cycle.

In this respect, descriptions will be provided for how to determine the changes in the conditions of the road surface. In this embodiment, the 35 (5×7) spotlights of the patterned light 32a are projected on the road surface. Thus, for example, if only 80% or less of the 35 spotlights, or only 28 or less spotlights, can be detected on the image captured by the camera 12, the road surface condition determination unit 30 determines that: the road surface becomes very uneven or bumpy; and the conditions of the road surface change as much as or more than the threshold value.

Instead, the road surface condition determination unit 30 may estimate the changes in the conditions of the road surface from an amount of changes in heights of the road surface. The amount of changes in heights of the road surface can be detected from oscillations of a value detected by a stroke sensor attached to the suspension of each wheel of the vehicle. For example, if the oscillations of the value detected by the stroke sensor becomes equal to or greater than 1 Hz, the road surface condition determination unit 30 estimates that the road surface becomes very uneven or bumpy, and determines that the conditions of the road surface change as much as or more than the threshold value. Alternatively, the road surface condition determination unit 30 may be configured to: calculate a velocity in the vertical direction by integrating values detected by an acceleration sensor for measuring the acceleration in the vertical direction; and thereby determine that the road surface becomes very uneven or bumpy and the conditions of the road surface change as much as or more than the threshold value, when a change in the direction of the velocity becomes equal to or greater than 1 Hz.

Otherwise, the amount of changes in heights of the road surface may be estimated from the position of the patterned light 32a on the image captured by the camera 12. In the embodiment, the patterned light 32a as shown in FIG. 7 is projected onto the road surface 31. In this case, a line segment 71 joining spotlights of the patterned light 32a in an X direction, and a line segment 73 joining spotlights of the patterned light 32a in a Y direction are drawn. Thereafter, if as indicated by a point 75, the inclination of any of these line segments changes 15 or more degrees in the middle of the line segment, the road surface condition determination unit 30 estimates that the road surface becomes very uneven or bumpy, and determines that the conditions of the road surface change as much as or more than the threshold value. Instead, as shown in FIG. 7, the road surface condition determination unit 30 may determine that the conditions of the road surface change as much as or more than the threshold value, when a difference between distances d1, d2 between adjacent spotlights changes as much as or more than 50%.

Once the road surface condition determination unit 30 thus determines that the conditions of the road surface change as much as or more than the threshold value, the self-location calculation unit 26 fixes the starting points at the current position of the vehicle 10, as well as the current distance and attitude angle of the vehicle 10 relative to the road surface, which are calculated in the previous information process cycle. Thus, the attitude angle calculation unit 22 stops calculating the distance and attitude angle of the vehicle 10 relative to the road surface. Meanwhile, the self-location calculation unit 26 calculates the current position of the vehicle 10 in present, as well as the current distance and attitude angle of the vehicle 10 in present relative to the road surface, by adding the amount of change in the attitude to the current position of the vehicle 10, as well as the current distance and attitude angle of the vehicle 10 relative to the road surface, which are calculated in the previous information process cycle.

Figure 8:
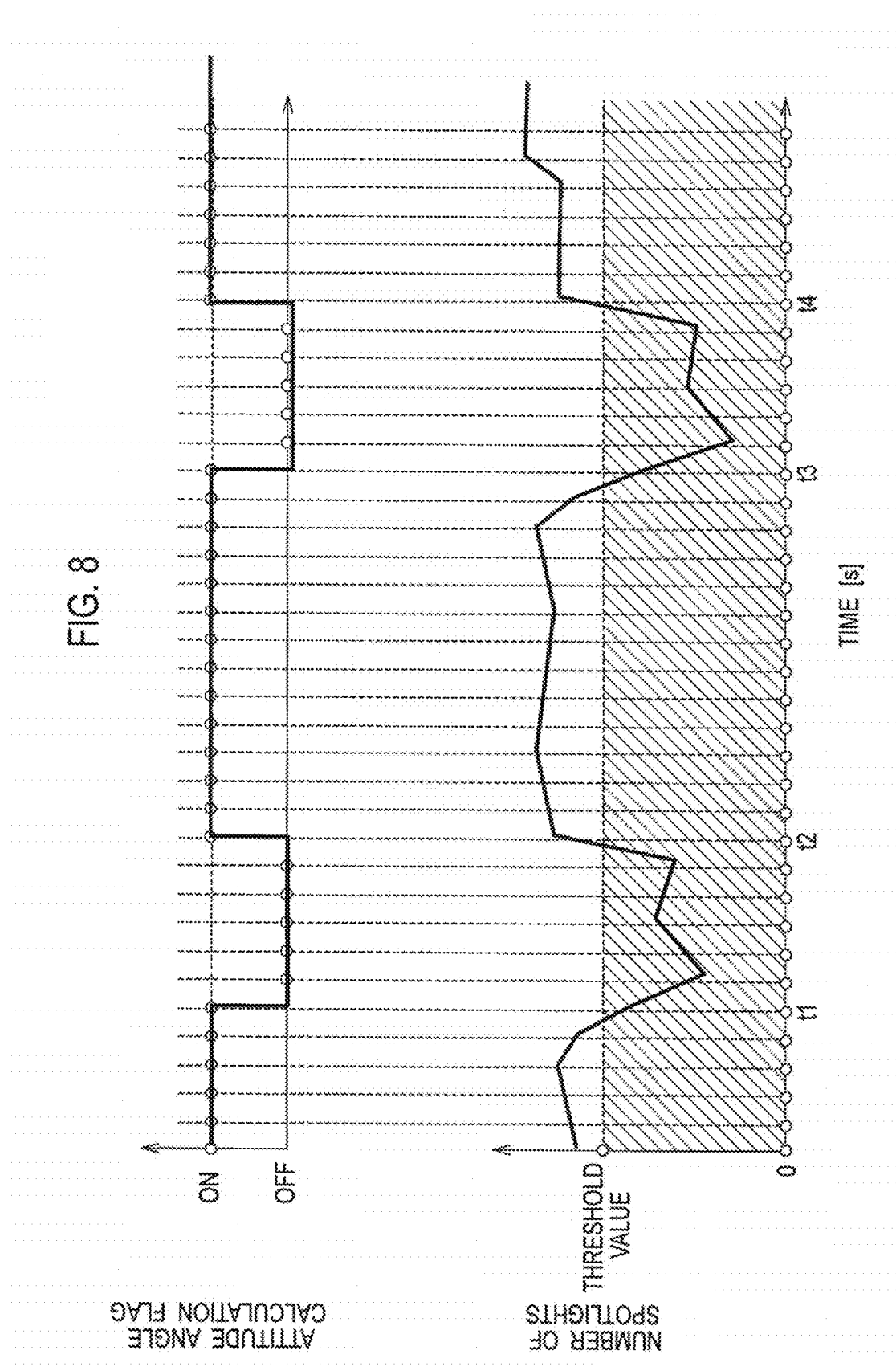
FIG. 8 is a time chart showing a process in which the self-location calculating device of the first embodiment makes a determination on changes in conditions of the road surface.

For example, as shown in FIG. 8, the road surface condition determination unit 30 monitors the number of detected spotlights, and sets the threshold value at 28 which corresponds to 80% of the 35 spotlights. In this case, while 28 or more spotlights can be detected, the road surface condition determination unit 30 sets an attitude angle calculation flag at "ON." Thereby, the attitude angle calculation unit 22 calculates the distance and attitude angle of the vehicle 10 relative to the road surface. Meanwhile, the self-location calculation unit 26 calculates the current self-location of the vehicle by: calculating the current distance and attitude angle using the distance and attitude angle of the vehicle calculated by the attitude angle calculation unit 22; and adding (continuing the integration operation) the amount of movement of the vehicle to the current position of the vehicle 10 which is calculated in the previous information process cycle.

However, at time t1 when the number of detected spotlights becomes less than the threshold value, the self-location calculation unit 26 switches the attitude angle calculation flag to "OFF." Thereby, the starting points are fixed at the current position of the vehicle 10, as well as the current distance and attitude angle of the vehicle 10 relative to the road surface, which are calculated in the previous information process cycle. The attitude angle calculation unit 22 stops calculating the distance and attitude angle of the vehicle 10. Thus, the self-location calculation unit 26 calculates the current position of the vehicle in present, as well as the current distance and attitude angle of the vehicle in present relative to the road surface, by adding the amount of change in the attitude to the current position of the vehicle 10, as well as the current distance and attitude angle of the vehicle 10 relative to the road surface, which are calculated in the previous information process cycle.

Thereafter, at time t2 when the number of detected spotlights becomes greater than the threshold value again, the attitude angle calculation flag is set at "ON." The attitude angle calculation unit 22 resumes calculating the distance and attitude angle of the vehicle 10. Thereby, the self-location calculation unit 26 calculates the current distance and attitude angle of the vehicle 10 using the distance and attitude angle of the vehicle 10 calculated by the attitude angle calculation unit 22. As described above, when the conditions of the road surface change to a large extent, the self-location calculating device of the embodiment uses the current position of the vehicle 10, as well as the current distance and attitude angle of the vehicle 10 relative to the road surface, which are calculated in the previous information process cycle, instead of using the distance and attitude angle of the vehicle 10 calculated by the attitude angle calculation unit 22. Thus, even when the conditions of the road surface change to a large extent, the self-location calculating device of the embodiment is capable of calculating the self-location of the vehicle 10 accurately and stably.

Figure 9:
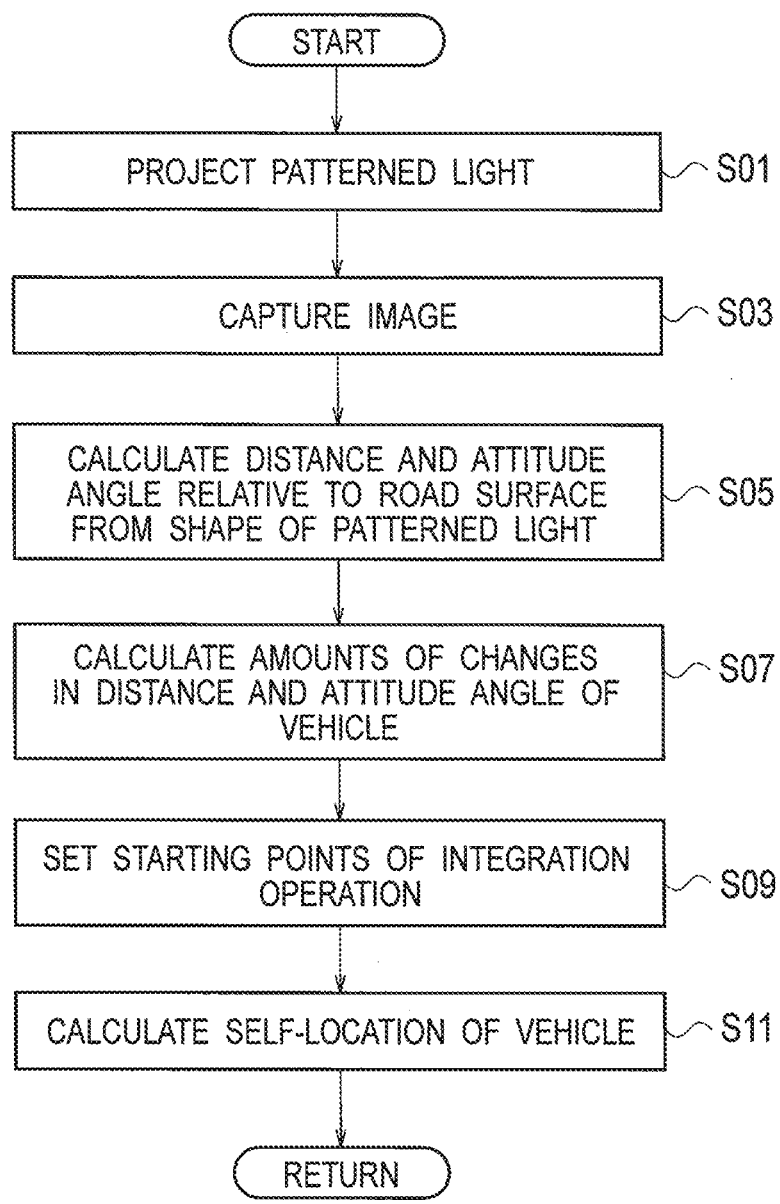
FIG. 9 is a flowchart showing a procedure for a self-location calculating process to be performed by the self-location calculating device of the first embodiment.
Figure 10:
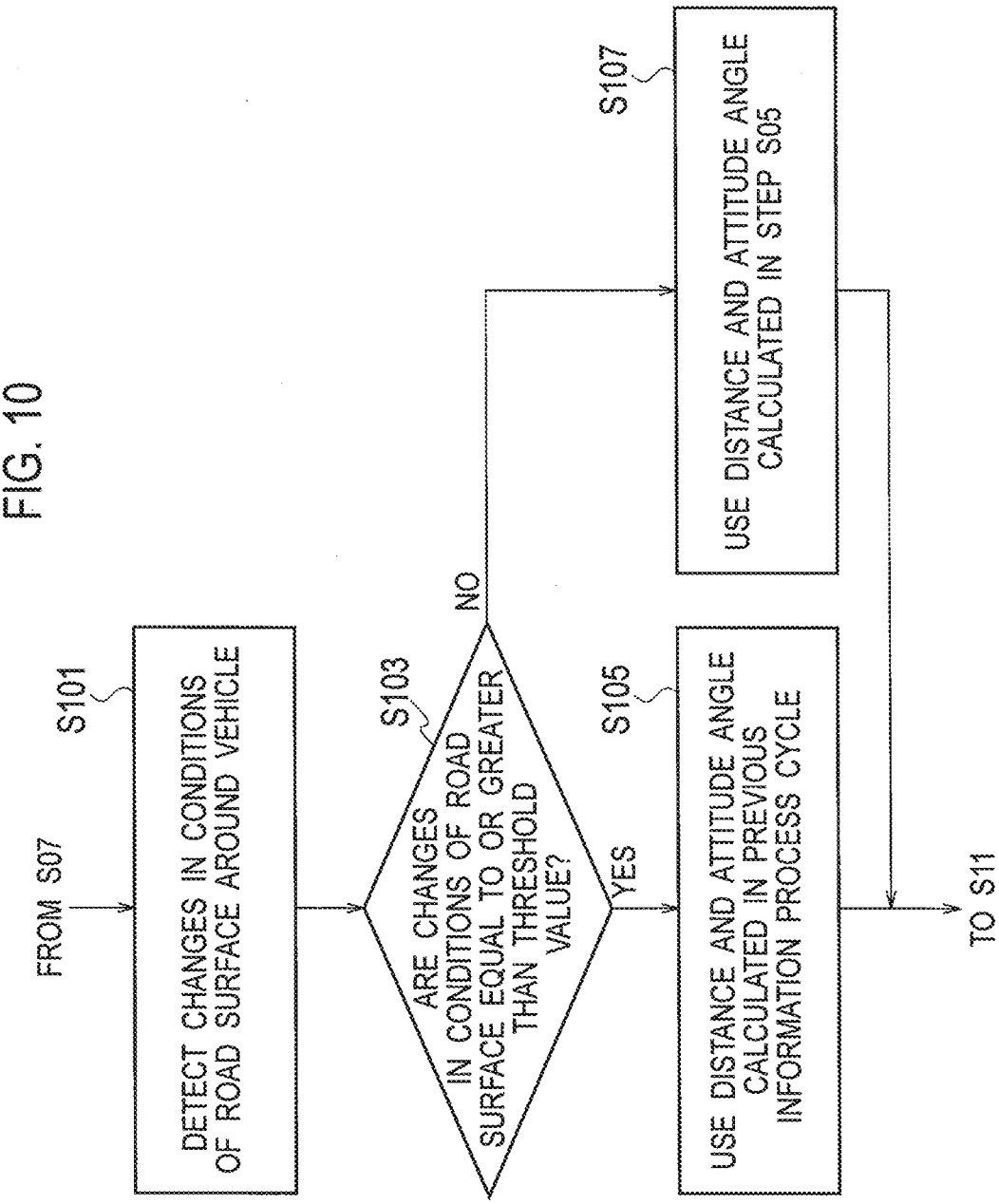
FIG. 10 is a flowchart showing a procedure for a detailed process in step S09 in FIG. 9 to be performed by the self-location calculating device of the first embodiment.

[Information Process Cycle] Next, referring to FIGS. 9 and 10, descriptions will be provided for the information process cycle to be repeatedly performed by the ECU 13. The information process cycle is an example of a self-location calculating method of calculating the self-location of the vehicle 10 from the image 38 obtained by the camera 12.

The information process cycle shown in a flowchart of FIG. 9 is started at the same time as the self-location calculating device becomes activated after the ignition switch of the vehicle 10 is turned on, and is repeatedly performed until the self-location calculating device stops its operation.

In step S01 in FIG. 9, the patterned light control unit 27 controls the light projector 11 so as to project the patterned light 32a onto the road surface 31 around the vehicle. In the flowchart in FIG. 9, descriptions will be provided for a case where the patterned light 32a is continuously projected.

Proceeding to step S03, the ECU 13 controls the camera 12 to obtain the image 38 by making the camera 12 shoot the road surface 31 around the vehicle, inclusive of an area onto which the patterned light 32a is projected. The ECU 13 stores the data on the image obtained by the camera 12 into the memory.

It should be noted that the ECU 13 is capable of automatically controlling the diaphragm of the camera 12. The ECU 13 may be configured to perform a feedback control of the diaphragm of the camera 12 in a way that makes a value of brightness of the image becomes a median value between the maximum and minimum values in accordance with an average of the brightness of the image 38 obtained in the previous information process cycle. Otherwise, since the value of the brightness of the area onto which the patterned light 32a is projected is high, the ECU 13 may obtain an average value of the brightness from an area outside a part from which the patterned light 32a is extracted.

Proceeding to step S05, to begin with, the patterned light extraction unit 21 reads the image 38 obtained by the camera 12 from the memory, and extracts the position of the patterned light 32a from the image 38, as shown in FIG. 4(c). The patterned light extraction unit 21 stores the coordinates (Uj, Vj) of each spotlight Sp on the image, which are calculated as the data indicating the position of the patterned light 32a, into the memory.

Furthermore, in step S05, the attitude angle calculation unit 22 reads the data indicating the position of the patterned light 32a from the memory, calculates the distance and attitude angle of the vehicle 10 relative to the road surface 31 from the position of the patterned light 32a, and stores the thus-calculated distance and attitude angle into the memory.

Proceeding to step S07, the ECU 13 detects the feature points from the image 38, extracts the feature points which have correspondence relation between the previous and current information process cycles, and calculates the amounts of changes in the distance and attitude angle from the positions (Ui, Vi) of the respective extracted feature points on the image. In addition, the ECU 13 calculates the amount of movement of the vehicle.

To put it specifically, to begin with, the feature point detection unit 23 reads the image 38 obtained by the camera 12 from the memory, detects the feature points on the road surface 31 from the image 38, and stores the positions (Ui, Vi) of the respective feature points on the image into the memory.

The attitude change amount calculation unit 24 reads the positions (Ui, Vi) of the respective feature points on the image from the memory, and calculates the relative positions (Xi, Yi, Zi) of the respective feature points relative to the camera 12 from the distance and attitude angle which are calculated by the attitude angle calculation unit 22 as well as the positions (Ui, Vi) of the feature points on the image. Incidentally, the attitude change amount calculation unit 24 uses the distance and attitude angle which are set in step S09 in the previous information process cycle. Thereafter, the attitude change amount calculation unit 24 stores the relative positions (Xi, Yi, Zi) of the feature points relative to the camera 12 into the memory.

After that, the attitude change amount calculation unit 24 reads the positions (Ui, Vi) of the feature points on the image, and the relative positions (Xi, Yi, Zi) of the feature points calculated in step S07 in the previous information process cycle from the memory. The attitude change amount calculation unit 24 calculates the amounts of changes in the distance and attitude angle using: the relative positions (Xi, Yi, Zi) of the feature points which have correspondence relation between the previous and current information process cycles; and the positions (Ui, Vi) of the thus-corresponding feature points on the image. Furthermore, the attitude change amount calculation unit 24 calculates the amount of movement of the vehicle from the previous relative positions (Xi, Yi, Zi) of the feature points and the current relative positions (Xi, Yi, Zi) of the feature points, and stores the resultant amount of movement of the vehicle into the memory. The "amounts of changes in the distance and attitude angle" and the "amount of movement of the vehicle" which are calculated in step S07, are used for the process in step S11.

Proceeding to step S09, the ECU 13 sets the starting points of the integration operation for calculating the self-location according to the changes in the conditions of the road surface around the vehicle. Details will be later described referring to FIG. 10.

Proceeding to step S11, the self-location calculation unit 26 calculates the self-location of the vehicle 10 from: the starting points of the integration operation set in step S09; and the amounts of changes in the distance and attitude angle of the vehicle 10 calculated in the process in step S07.

Thus, the self-location calculating device of the embodiment is capable of calculating the self-location of the vehicle 10 by repeatedly performing the foregoing series of information process cycles to integrate the amount of movement of the vehicle 10.

[Process in Step S09] Next, referring to a flowchart in FIG. 10, descriptions will be provided for a detailed procedure in step S09 in FIG. 9. As shown in FIG. 10, in step S101, the road surface condition determination unit 30 detects the changes in the conditions of the road surface around the vehicle. To put it specifically, the road surface condition determination unit 30 detects the number of spotlights of the patterned light 32a, or detects the oscillations of the value detected by the stroke sensor attached to each wheel. Otherwise, the road surface condition determination unit 30 may be configured to calculate the velocity in the vertical direction by integrating the values detected by the acceleration sensor capable of measuring the acceleration of the vehicle in the vertical direction, or to detect the position of the patterned light 32a.

Subsequently, in step S103, the road surface condition determination unit 30 determines whether or not the conditions of the road surface change as much as or more than the threshold value. For example, in a case where the road surface condition determination unit 30 is configured to detect the number of spotlights of the patterned light 32a, if only 28 or less spotlights out of the 35 spotlights can be detected on the image obtained by the camera, the road surface condition determination unit 30 determines that: the road surface becomes very uneven or bumpy; and the conditions of the road surface change as much as or more than the threshold value.

Otherwise, in the case of using the stroke sensor, the road surface condition determination unit 30 determines that the conditions of the road surface change as much as or more than the threshold value when the oscillations of the detected value become equal to or greater than 1 Hz. Furthermore, in a case of using the acceleration sensor, the road surface condition determination unit 30 calculates the velocity in the vertical direction by integrating the values detected by the acceleration sensor. If the changes in the direction of the velocity become equal to or greater than 1 Hz, the road surface condition determination unit 30 determines that the conditions of the road surface change as much as or more than the threshold value.

Moreover, in a case of using the position of the patterned light 32a, if the inclination of one of the line segments joining the spotlights changes 15 or more degrees in its middle of the line segment, the road surface condition determination unit 30 determines that the conditions of the road surface change as much as or more than the threshold value. Otherwise, if a difference between distances between adjacent spotlights changes as much as or more than 50%, the road surface condition determination unit 30 may determine that the conditions of the road surface change as much as or more than the threshold value.

As described above, the road surface condition determination unit 30 determines whether or not the conditions of the road surface around the vehicle change as much as or more than the threshold value. When the road surface condition determination unit 30 determines that the conditions of the road surface around the vehicle change as much as or more than the threshold value (YES in step S103), the procedure proceeds to step S105. On the other hand, when the road surface condition determination unit 30 determines that the conditions of the road surface around the vehicle does not change so much as or more than the threshold value (NO in step S103), the procedure proceeds to step S107.

In step S105, the self-location calculation unit 26 fixes the current position of the vehicle 10, as well as the current distance and attitude angle of the vehicle 10 relative to the road surface, at the current position of the vehicle 10, as well as the current distance and attitude angle of the vehicle 10 relative to the road surface, which are calculated in the previous information process cycle. In other words, the self-location calculation unit 26 sets the current position of the vehicle 10, as well as the current distance and attitude angle of the vehicle 10 relative to the road surface, which are calculated in the previous information process cycle, as the starting points of the integration operation.

Thereby, the attitude angle calculation unit 22 stops calculating the distance and attitude angle of the vehicle 10 relative to the road surface. Meanwhile, the self-location calculation unit 26 calculates the current position of the vehicle 10 in present, as well as the current distance and attitude angle of the vehicle 10 in present relative to the road surface, by adding the amount of change in the attitude to the current position of the vehicle 10, as well as the current distance and attitude angle of the vehicle 10 relative to the road surface, which are calculated in the previous information process cycle.

On the other hand, in step S107, the self-location calculation unit 26 sets the starting points of the integration operation at the current position of the vehicle 10, as well as the current distance and attitude angle of the vehicle 10 relative to the road surface, which are calculated in step S05 in the current information process cycle.

Thereby, the self-location calculation unit 26 calculates the current position of the vehicle 10, as well as the current distance and attitude angle of the vehicle 10 relative to the road surface, by adding the amount of change in the attitude to the current position of the vehicle 10, as well as the current distance and attitude angle of the vehicle 10 relative to the road surface, which are calculated in the current information process cycle.

Once as described above, the self-location calculation unit 26 sets the starting points of the integration operation for calculating the current position of the vehicle 10 in present, as well as the current distance and attitude angle of the vehicle 10 in present relative to the road surface, the process in step S09 is terminated, and the procedure proceeds to step S11 in FIG. 9.

[Effect of First Embodiment] As described in detail above, when determining that the conditions of the road surface around the vehicle change as much as or more than the threshold value, the self-location calculating device of the embodiment calculates the current position of the vehicle in present, as well as the current distance and attitude angle of the vehicle in present relative to the road surface, by adding the amount of change in the attitude to the current position of the vehicle, as well as the current distance and attitude angle of the vehicle relative to the road surface, which are calculated in the previous information process cycle. Thereby, the self-location calculating device of the embodiment is capable of accurately calculating the self-location of the vehicle even if the road surface around the vehicle is uneven or bumpy.

Figure 11:
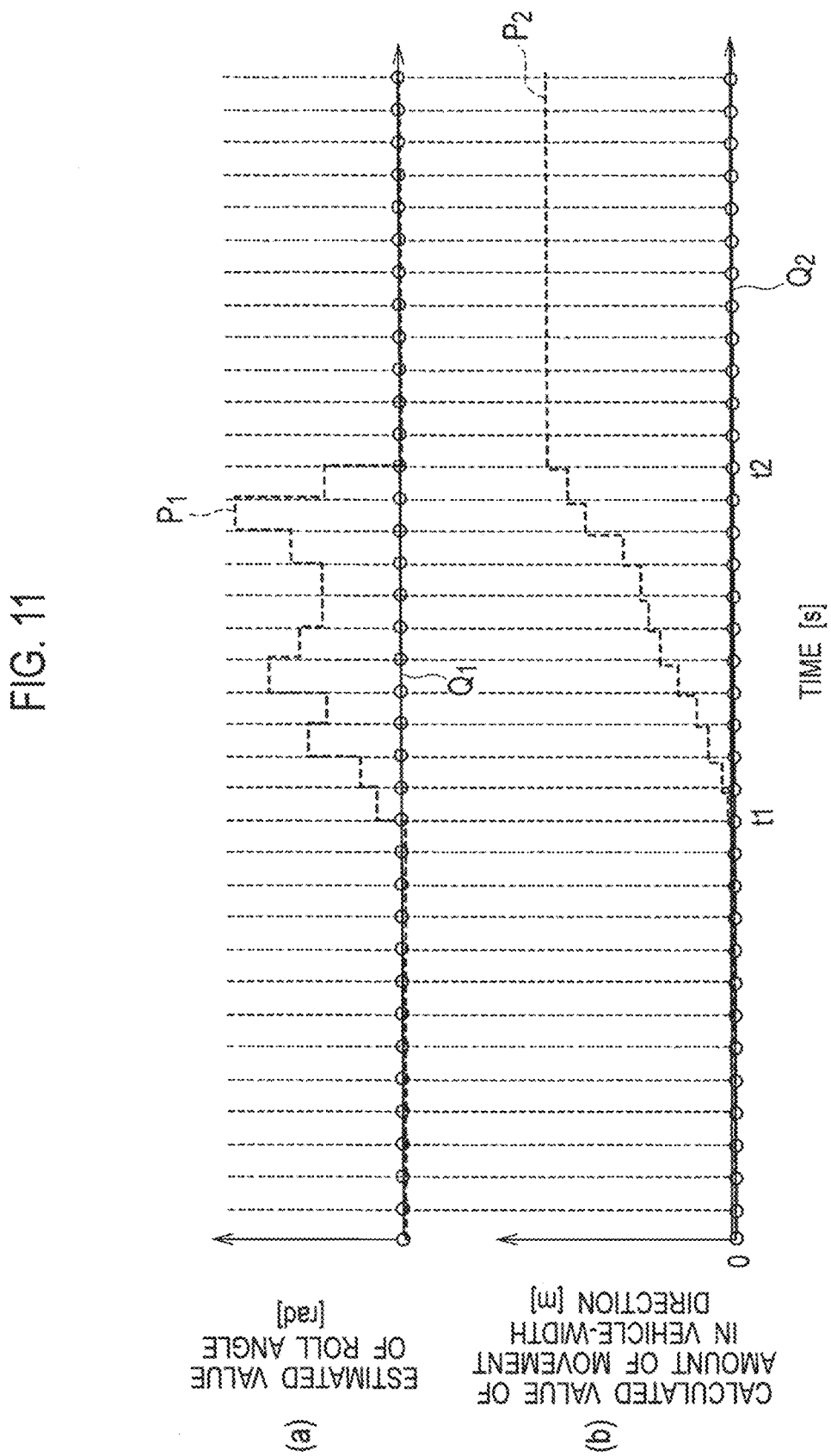
FIG. 11 is a diagram showing an example of an error in estimating a roll angle of the vehicle, and an example of an error in estimating an amount of movement of the vehicle.

A problem with the conventional method is that when the road surface around the vehicle becomes uneven or bumpy, the error in the amount of movement of the vehicle increases. For example, FIG. 11 shows an example of an error in estimating a roll angle (an example of the attitude angle) of the vehicle 10, and an example of an error in estimating the amount of movement (in the vehicle-width direction) of the vehicle 10. FIG. 11(*a*) shows a temporal change in a value of the roll angle of the vehicle 10 which is calculated in a case where the vehicle 10 is running straightly which causes no roll angle, while FIG. 11(*b*) shows a temporal change in a value of the amount of movement of the vehicle 10 which is calculated in the same case. "P1" and "P2" in FIG. 11 respectively represent the value in a case where the amount of movement of the vehicle is calculated using the conventional method. "Q1" and "Q2" in FIG. 11 respectively represent the true values which are the actual value.

While the vehicle 10 is running straightly, the true value (Q1) of the roll angle and the true value (Q2) of the amount of movement in the vehicle-width direction remain unchanged at zero. However, between time t1 and time t2, an error occurs in the plane equation of the road surface and this error causes an error in calculating the roll angle, because the vehicle 10 runs an uneven or bumpy road. The error in the roll angle becomes reflected in the error in the amount of movement in the vehicle-width direction. In addition, the integration operation amplifies the error in the amount of movement in the vehicle-width direction. The cause of this problem is that even though the conditions of the road surface around the vehicle changes due to the unevenness or the like, the distance and attitude angle are calculated in each information process cycle.

With this taken into consideration, when determining that the conditions of the road surface around the vehicle change as much as or more than the threshold value, the self-location calculating device of the embodiment stops calculating the current position of the vehicle 10, as well as the current distance and attitude angle of the vehicle 10 relative to the road surface, and uses, as the starting points, the current position of the vehicle 10, as well as the current distance and attitude angle of the vehicle 10 relative to the road surface, which are calculated in the previous information process cycle.

Thus, even if the conditions of the road surface around the vehicle change in the current information process cycle, the use of the values obtained in the previous information process cycle enables the self-location calculating device of the embodiment to prevent the errors from being amplified as indicated by P1 and P2 in FIG. 11, and to accurately calculate the self-location of the vehicle 10.

In addition, the self-location calculating device of the embodiment estimates the changes in the conditions of the road surface from the amount of change in the height of the road surface. Thereby, the self-location calculating device of the embodiment is capable of securely detecting the unevenness or bumps on the road surface, and accordingly capable of accurately calculating the self-location of the vehicle.

In addition, the self-location calculating device of the embodiment estimates the amount of change in the height of the road surface from the position of the patterned light. Thereby, the self-location calculating device of the embodiment is capable of detecting the changes in the conditions of the road surface without using a sensor which would otherwise be installed in the vehicle, and accordingly capable of accurately calculating the self-location of the vehicle with the simple method.

[Second Embodiment]

Next, referring to the drawings, descriptions will be provided for a self-location calculating device of a second embodiment of the present invention. It should be noted that the configuration of the self-location calculating device of the embodiment is the same as that of the first embodiment shown in FIG. 1. For this reason, detailed descriptions will be omitted.

In the first embodiment described above, the distance and attitude angle of the vehicle 10 are calculated in each information process cycle. This embodiment is different from the first embodiment in that the distance and attitude angle of the vehicle 10 are calculated in each constant period.

Figure 12:
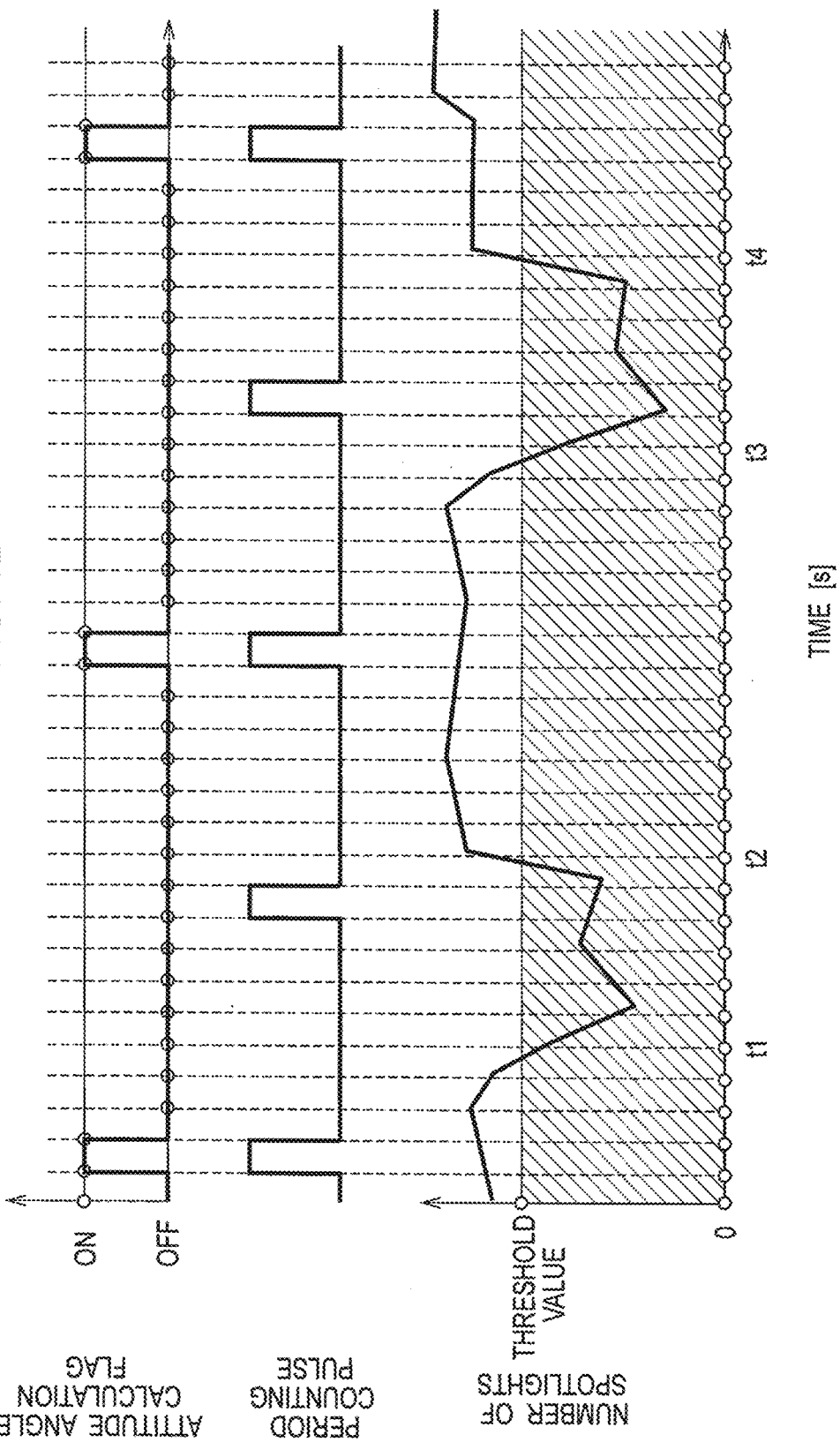
FIG. 12 is a time chart showing a process in which the self-location calculating device of a second embodiment makes a determination on changes in conditions of the road surface.

To this end, as shown in FIG. 12, the self-location calculating device of the embodiment is set to generate a period counting pulse in each constant period, for example, corresponding to 8 frames or the like, and sets the attitude angle calculation flag at "ON" each time generating the period counting pulse. Thus, the distance and attitude angle of the vehicle 10 can be calculated in each constant period.

Nevertheless, if the conditions of the road surface around the vehicle change as much as or more than the threshold value at the time of generating the period counting pulse, that is to say, if the number of detected spotlights is equal to or less than the threshold value, the self-location calculating device makes the attitude angle calculation flag to remain "OFF" instead of setting the flag at "ON." For example, during a time between time t1 and time t2, the self-location calculating device makes the attitude angle calculation flag to remain "OFF" instead of setting the flag at "ON" while generating the period counting pulse, since the number of detected spotlights is equal to or less than the threshold value.

Thereby, if the road surface around the vehicle is uneven or bumpy, the road surface condition determination unit 30 fixes the current position of the vehicle, as well as the current distance and attitude angle of the vehicle relative to the road surface, at the distance and attitude angle which are calculated in the previous information process cycle. Thus, the attitude angle calculation unit 22 stops calculating the current position of the vehicle, as well as the current distance and attitude angle of the vehicle relative to the road surface. Meanwhile, the self-location calculation unit 26 calculates the current position of the vehicle 10 in present, as well as the current distance and attitude angle of the vehicle 10 in present relative to the road surface, by adding the amount of change in the attitude to the current position of the vehicle 10, as well as the current distance and attitude angle of the vehicle 10 relative to the road surface, which are calculated in the previous information process cycle.

[Information Process Cycle]

The information process cycle performed by the self-location calculating device of the embodiment is the same as that of the first embodiment shown in FIG. 9. For this reason, detailed descriptions will be omitted. The embodiment is different from the first embodiment in the step of setting the starting points of the integration operation in step S09 in FIG. 9.

[Process in Step S09]

Figure 13:
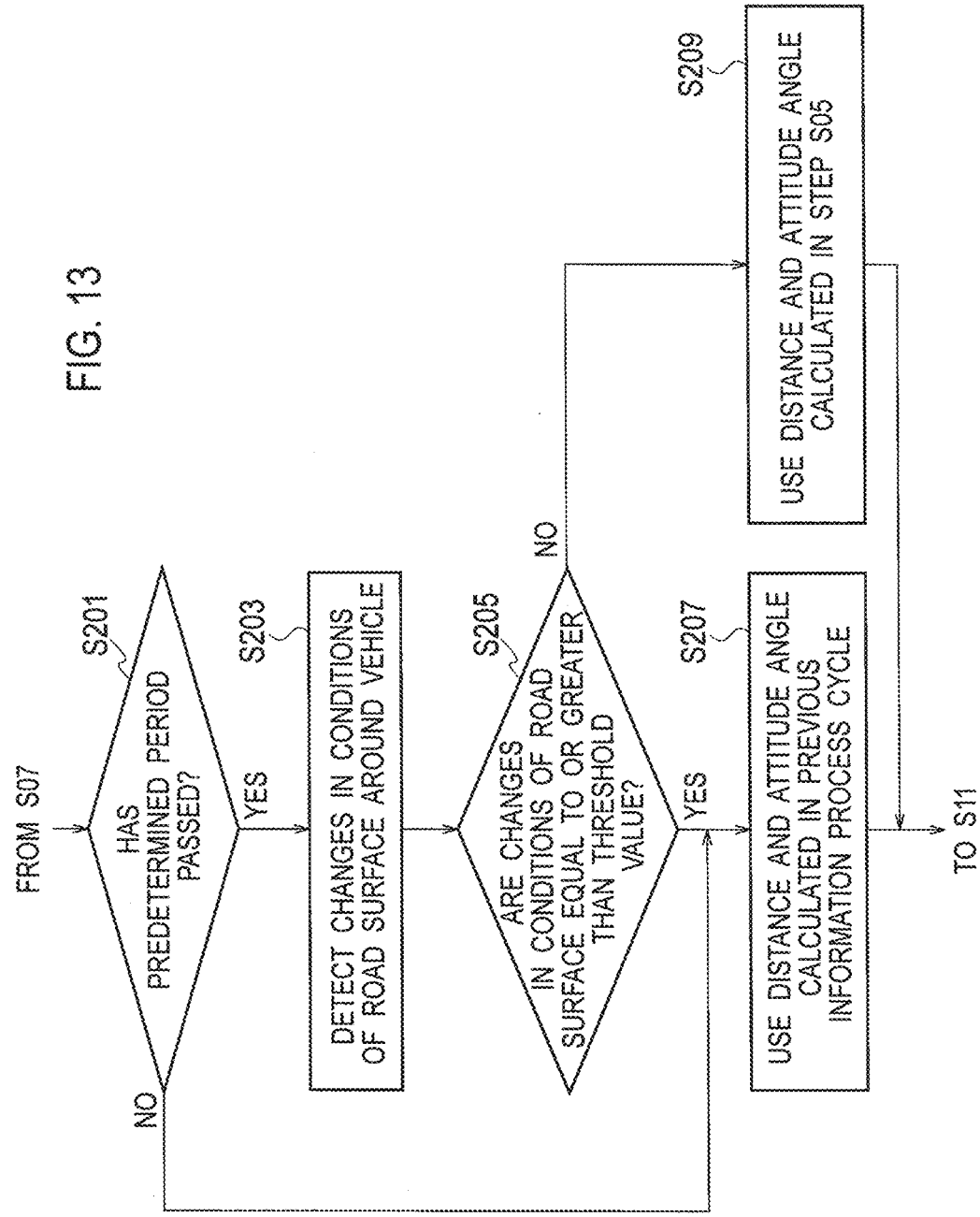
FIG. 13 is a flowchart showing a procedure for a detailed process in step S09 in FIG. 9 to be performed by the self-location calculating device of the second embodiment.

Next, referring to a flowchart in FIG. 13, descriptions will be provided for a detailed procedure in step S09 in FIG. 9. As shown in FIG. 13, in step S201, the road surface condition determination unit 30 determines whether or not the predetermined period has passed. As described using FIG. 12, the road surface condition determination unit 30 monitors whether or not the period counting pulse is generated. When the period counting pulse is generated, the road surface condition determination unit 30 determines that the predetermined period has passed, and the procedure proceeds to step S203. On the other hand, when no period counting pulse is generated, the road surface condition determination unit 30 determines that the predetermined period has not passed, and the procedure proceeds to step S207.

Processes in the ensuing steps S203 to S209 are the same as the processes in steps S101 to S107 in FIG. 10, respectively. For this reason, detailed descriptions will be omitted.

[Effect of Second Embodiment]

As described in detail above, the self-location calculating device of the embodiment calculates the distance and attitude angle of the vehicle in each constant period. If determining that the conditions of the road surface around the vehicle change as much as or more than the threshold value during any constant period, the self-location calculating device calculates the current position of the vehicle in present, as well as the current distance and attitude angle of the vehicle in present relative to the road surface, by adding the amount of change in the attitude to the current position of the vehicle, as well as the current distance and attitude angle of the vehicle relative to the road surface, which are calculated in the previous information process cycle. This reduces the frequency at which the attitude angle calculation unit 22 calculates the distance and attitude angle of the vehicle. Accordingly, it is possible to reduce the operation load of the ECU 13, and to increase the operation speed of the ECU 13.

It should be noted that the foregoing embodiments are examples of the present invention. For this reason, the present invention is not limited to the foregoing embodiments. It is a matter of course that: the present invention can be carried out in modes different from the foregoing embodiment; and according to designs, various modifications can be made to the present invention within a scope not departing from the technical idea of the present invention.

REFERENCE SIGNS LIST 10 vehicle
11 light projector
12 camera (image capturing unit)
13 ECU
21 patterned light extraction unit
22 attitude angle calculation unit
23 feature point detection unit
24 attitude change amount calculation unit
26 self-location calculation unit
27 patterned light control unit
30 road surface condition determination unit
31 road surface
32a, 32b patterned light
Te feature point

The invention claimed is:

1. A self-location calculating device comprising:
a light projector configured to project a patterned light onto a road surface around a vehicle;
an image capturing unit installed in the vehicle, and configured to capture and obtain an image of the road surface around the vehicle including an area onto which the patterned light is projected;
an attitude angle calculation unit configured to calculate an attitude angle of the vehicle relative to the road surface from a position of the patterned light on the image obtained by the image capturing unit;
an attitude change amount calculation unit configured to calculate an amount of change in the attitude of the vehicle based on temporal changes in a plurality of feature points on the road surface on the image obtained by the image capturing unit;
a self-location calculation unit configured to calculate a current position and a current attitude angle of the vehicle by adding the amount of change in the attitude to an initial position and the attitude angle of the vehicle; and
a road surface condition determination unit configured to determine whether or not a condition of the road surface around the vehicle changes as much as or more than a threshold value by detecting a change in the condition of the road surface, wherein
when the road surface condition determination unit determines that the condition of the road surface changes as much as or more than the threshold value, the self-location calculation unit calculates the current position and the current attitude angle of the vehicle by adding the amount of change in the attitude to the current position and the current attitude angle of the vehicle which are calculated in a previous information process cycle.

2. The self-location calculating device according to claim 1, wherein the road surface condition determination unit estimates the change in the condition of the road surface from an amount of change in a height of the road surface.

3. The self-location calculating device according to claim 2, wherein the road surface condition determination unit estimates the amount of change in the height of the road surface from the position of the patterned light.

4. A self-location calculating method comprising:
a procedure of projecting a patterned light onto a road surface around a vehicle from a light projector installed in the vehicle;
a procedure of capturing and obtaining an image of the road surface around the vehicle including an area onto which the patterned light is projected, by an image capturing unit installed in the vehicle;
a procedure of calculating an attitude angle of the vehicle relative to the road surface from a position of the patterned light on the image in a control unit of the vehicle;
a procedure of calculating an amount of change in the attitude of the vehicle based on temporal changes in a plurality of feature points on the road surface on the image in the control unit;
a self-location calculating procedure of calculating a current position and a current attitude angle of the vehicle by adding the amount of change in the attitude to an initial position and the attitude angle of the vehicle in the control unit; and
a road surface condition determining procedure of determining whether or not a condition of the road surface around the vehicle changes as much as or more than a threshold value by detecting a change in the condition of the road surface in the control unit, wherein when in the road surface condition determining procedure, it is determined that the condition of the road surface changes as much as or more than the threshold value, the current position and the current attitude angle of the vehicle are calculated in the self-location calculating procedure by adding the amount of change in the attitude to the current position and the current attitude angle of the vehicle which are calculated in a previous information process cycle.

* * * * *